Patented Sept. 8, 1936

2,053,773

UNITED STATES PATENT OFFICE 2,053,773

THERMOPLASTIC ADHESIVE AND MEDIUM FOR MAKING LAMINATED FABRICS

Ralph M. Freydberg, New York, N. Y., assignor to Acme Backing Corporation, Brooklyn, N. Y., a corporation of New York No Drawing. Application April 18, 1935, Serial No. 17,153

16 Claims.  (Cl. 134—26)

My present invention relates to adhesives, and particularly to thermoplastic adhesives, especially though not exclusively, adapted for use in producing laminated fabrics possessing certain desirable qualities and characteristics hereinafter pointed out.

I am aware that it has been proposed to produce laminated fabrics by providing between the layers, thermoplastic and adhesive compositions to unite the layers of fabrics when they are subjected to heat and pressure or to the action of special solvents. So far as I am aware, there has not been provided a thermoplastic adhesive composition for uniting layers of fabrics capable of use in making articles subject to successive laundering and/or dry cleaning operations, and which will withstand the effects of the laundering or dry-cleaning solutions and/or the heat to which the articles are subjected so as to preserve the initial unitary character of the fabric from which the articles are made.

In the manufacture of many articles of wearing apparel, it is customary or necessary to provide an inner or intermediate lining intended to impart to the articles a stiffness or body which will maintain them in desired shape conducive to a neat appearance. I might give many illustrations of such articles, but I will only point out a few as illustrative, such as collars, both attached and unattached, cuffs, etc. In the manufacture of collars and cuffs, it is usual to provide inner and outer layers of soft or limp fabric between which is an interlining of a different nature or character, usually stiffer. The purpose of the interlining is to impart additional body or stiffness to the articles, so that the articles will maintain their shape before and after laundering, and/or dry-cleaning and pressing. However, each laundering operation requires the use of starch to impart to the articles a stiffness beyond the normal stiffness of the fabrics from which the articles are made. Also, the inner and outer layers and interlining are usually stitched or bound together adjacent their edges, and since the several layers are attached or secured together only at their margins, they have relative movement between their margins, which results in the formation of visible and objectionable wrinkles or creases when being pressed or ironed.

With the foregoing in mind, the general object of my present invention is to provide a thermoplastic composition or compositions with which to impregnate fabrics, so that said fabrics may be used as interlinings or backings to be firmly joined to other fabrics under the action of heat and pressure to form a substantially integral laminated fabric which will withstand successive laundering and dry-cleaning operations.

The foregoing general object is accomplished by providing a composition or compositions easily applied to the fabric forming the interlinings or backings, which imparts to the linings or backings a permanent flexible stiffness not affected by moisture or heat; and which is not adversely affected by exposure to light.

My invention provides a thermoplastic adhesive, or an impregnated fabric or interlining capable of being united to another or other fabrics by heat and pressure, and by means of which all of the fabrics are firmly and uniformly united throughout their entire contacting faces, thus forming a substantially unitary laminated fabric. No objectionable creases or wrinkles will be created on any layers of the laminated fabric during an ironing or pressing operation. Furthermore, since the interlining possesses a flexible stiffness not affected by moisture or heat, this same flexible stiffness is imparted to the fabric or fabrics united thereto obviating the use of starch when laundering the articles made from the laminated fabric; and since the composition is not adversely affected by exposure to light, the laminated fabric will not discolor.

As will be hereinafter pointed out, the laminated fabric may be freely washed or dry-cleaned under the usual procedures or formulas because the compositions uniting the fabrics will not be adversely affected thereby, and each time the articles made from the laminated fabric are ironed or pressed, the same will retain their original characteristics and appearance, namely, smoothness, flexible stiffness, (which flexible stiffness is such as to obviate visible cracks or wrinkles if the articles are bent), and firm adhesion or substantially integral formation.

Another important feature of the invention resides in the fact that the composition or compositions may be substantially transparent in character, so that they will not alter the color of the fabric impregnated thereby. For instance, a white fabric impregnated with the composition may be inserted between other layers of white fabric secured thereto without affecting the whiteness of the outer layers and/or may be inserted between layers of colored materials, either plain or designed, without affecting the appearance of such materials. On the other hand, the composition may be colored as desired, as hereinafter pointed out.

The weight or thickness of the material to be impregnated to form the interlining or backing depends of course on the use to which it is to be put. In the cases cited above as illustrative, such as collars, cuffs, shirt bosoms, and other relatively light materials, between which the impregnated fabric is to be used, I would select a material such as cotton sheeting of such weave as to permit impregnation thereof by the composition. Of course if the impregnated fabric is to be used in conjunction with heavier materials to form an interlining or backing therefor, I might select a material heavier than cotton sheeting, but would desire a material permitting impregnation.

The thermoplastic composition or compositions with which I coat and/or impregnate a fabric includes a composite of polymers of vinyl acetate and vinyl chloride, which is insoluble in alcohol, gasoline, naphtha, benzine, water and usual laundering fluids. A preferred formula is as follows:

*Example I*

| | Parts by weight |
|---|---|
| Composite polymer of conjointly polymerized vinyl chloride and vinyl acetate | 69 |
| Simple polymer of vinyl acetate | 31 |
| Vat blue (dye) | .01 |
| Acetone | 61 |
| Toluol | 123 |

The above formula contemplates preferably the use of the composite polymer of conjointly polymerized vinyl chloride and vinyl acetate in the proportions in which that composite polymer is now commercially sold under the trade name of "Vinylite H" for fabrics, or under the trade name of "Vinylite HF." It is to be understood, however, that the proportions of the polymerized vinyl acetate and vinyl chloride in the conjoint polymer may be varied within reasonable limits without departing from the invention. The example given specifying 69 parts by weight of the composite polymer and 31 parts by weight of the simple polymer of vinyl acetate, which may be the material, for example, sold under the trade name of "Vinylite A," gives the preferred proportions of these materials. These proportions may, however, be varied without departing from the invention and within rather wide limits. For example, the proportion of the composite polymer may vary from 10 to 90 parts, while the proportion of the simple polymer may correspondingly vary from 90 to 10 parts.

While the formulae given in this specification are referred to as mixtures, it is to be understood that that term is intended to include the material formed by the mixing of the ingredients. For example, the mixture of the composite polymers of conjointly polymerized vinyl chloride and vinyl acetate with the simple polymer of vinyl acetate in the proportions given may result in the formation of a solid solution possessing distinctive properties not possessed by either the simple polymer or the composite polymers separately.

Another possible modification in the formula in Example I, is the use of calcium stearate and Tornesite in the proportions of 1 part each. When these are used, the calcium stearate acts as a homogenizer, and the chlorinated rubber or Tornesite acts as a negative catalyst. I further wish to point out that I may use alkali earth metal stearates other than calcium stearate; and in lieu of the acetone and toluol, which are the solvents, I may substitute ethyl acetate.

When the ingredients above mentioned are thoroughly mixed, the resulting composition is a viscous substantially transparent or clear fluid, which may be applied cold or at ordinary temperatures to the fabric by any known type of coating or impregnating mechanism, such as doctor-blades or rollers. Furthermore, by sufficiently diluting the solution a viscosity may be obtained suitable for spraying, so that the composition can be sprayed on the fabric.

*Example II*

| | Parts |
|---|---|
| Composite polymers of conjointly polymerized vinyl acetate and vinyl chloride mixed with simple polymer of vinyl acetate, as in Example I. | 100 |
| Dibutyl phthalate | 10 |
| Chlorinated rubber | 1 |

The above ingredients would be mixed by subjection to heat and stirring, that is, in a heated mixer which would produce a paste-like composition, applied hot to the fabric by calender rollers.

Under Example II, the proportions of the polymerized vinyl acetate and vinyl chloride can be varied over the same range, or used in the same proportions, as under Example I. The dibutyl phthalate acts as the plasticizer, and the chlorinated rubber acts as the negative catalyst.

Compositions made in accordance with the above formulas and embodying the essential features thereof begin to soften at substantially 180° F., and firmly unite layers of fabric when subjected to a temperature of about 300° F. and pressure.

It will be understood that when the composition is used on a lining or backing fabric, as specified, it firmly unites said lining or backing to other fabrics, when the same are subjected to pressure and heat at a temperature of about 300° F., which is about the usual temperature of laundering irons. The lining or backing is dry when subjected to the heat and pressure, and the composition is softened and made tacky by the heat so that it adheres to the other fabrics under pressure.

I wish it to be understood that it is not essential to the use of the composition that it be applied to a lining or backing fabric, as it can be interposed directly between two or more layers of fabric to unite them and form a substantially unitary laminated fabric possessing the characteristics above mentioned.

I have discovered that a laminated fabric embodying the said composition and united thereby may be laundered and dry-cleaned without separation of the layers. The composition softens at the usual temperature of laundering fluids or at the boiling point of water, but retains its adhesive qualities and maintains the layers united. The water or washing fluids may pass through the laminated fabric to thoroughly cleanse the same, but when the wet or damp fabrics are subjected to heat and pressure, such as the action of an iron, as soon as the moisture is expelled, the fabric regains its original appearance and characteristics, above pointed out.

I have further discovered that the compound may be colored by adding thereto mineral fillers or high strength organic colors. Of course the addition of such fillers or colors may vary the viscosity of the compound, but they do not affect its permanent qualities.

The reason for mixing the conjointly polymerized vinyl chloride and vinyl acetate with the simple polymer of vinyl acetate, in substantially the proportions given, are, first, heat stability. I have discovered that the mixture of the conjointly polymerized vinyl acetate and vinyl chloride with the simple polymer of vinyl acetate resists discoloration under the influence of heat much better than either one individually, because the simple polymer of vinyl acetate has an apparent stabilizing effect on the tendency of the conjointly polymerized vinyl chloride and vinyl acetate to discolor under the action of heat. Secondly, the conjointly polymerized vinyl chloride and vinyl acetate does not become thermoplastic and adhesive at temperatures readily practicable, whereas the simple polymer of vinyl acetate softens at temperatures too low to sustain the bond desired at 200° F., which is the average laundering temperature.

I have found that a mixture of the conjointly polymerized vinyl acetate and vinyl chloride, and a simple polymer of vinyl acetate substantially as given, softens sufficiently to give the required bond between the layers of fabric at normal ironing temperatures, yet holds this bond at any temperature normally possible in a laundering process.

I have further found that by impregnating a cloth of such character as to present a mesh readily capable of impregnation to permit the compound to flow into the interstices, the adhesive medium or compound is so thoroughly embedded in the fibers of the fabric and in the interstices that it is possible for the bond between the fabrics to be slightly loosened during the laundering process, without, however, causing the layers of fabric to become actually detached one from the other. This permits the laundering fluids to pass through the articles made from the laminated fabric during a washing or dry-cleaning process, to thoroughly cleanse the articles, and then, as above pointed out, when the articles are subjected to heat and pressure during an ironing operation, the bond is again tightly formed, restoring the fabric to its original appearance and characteristics.

I claim:—

1. A thermoplastic composition for use in uniting layers of fabric and which maintains its adhesive qualities at temperatures below 212° F. comprising between 10 and 90 parts of a composite polymer of conjointly polymerized vinyl acetate and vinyl chloride, mixed with from 90 to 10 parts of a simple polymer of vinyl acetate and a solvent.

2. A thermoplastic composition for use in uniting layers of fabric and which maintains its adhesive qualities at temperatures below 212° F. comprising between 10 and 90 parts of a composite polymer of conjointly polymerized vinyl acetate and vinyl chloride, mixed with between 90 and 10 parts of a simple polymer of vinyl acetate, a small quantity of vat blue, and a solvent.

3. A thermoplastic composition for use in uniting layers of fabric comprising, between 10 and 90 parts of a composite polymer of conjointly polymerized vinyl acetate and vinyl chloride, between 90 and 10 parts of a simple polymer of vinyl acetate, mixed with a compatible plasticizer and a negative catalyst.

4. A thermoplastic composition for use in uniting layers of fabric and having a melting point at substantially 300° F. comprising, substantially 69 parts of a composite polymer of conjointly polymerized vinyl acetate and vinyl chloride, substantially 31 parts of a simple polymer of vinyl acetate, and a suitable solvent.

5. A thermoplastic composition for use in uniting layers of fabric and having a melting point at substantially 300° F. comprising, substantially 69 parts of a composite polymer of conjointly polymerized vinyl acetate and vinyl chloride, substantially 31 parts of a simple polymer of vinyl acetate, substantially 61 parts acetone, and substantially 123 parts of toluol.

6. A thermoplastic composition for use in uniting layers of fabric and having a melting point at substantially 300° F. comprising, substantially 69 parts of a composite polymer of conjointly polymerized vinyl acetate and vinyl chloride, substantially 31 parts of a simple polymer of vinyl acetate, substantially 61 parts acetone, substantially 123 parts of toluol; and .01 parts vat blue.

7. A thermoplastic composition for use in uniting layers of fabric and having a melting point at substantially 300° F. comprising, substantially 69 parts of composite polymer of conjointly polymerized vinyl acetate and vinyl chloride, substantially 31 parts of the simple polymer of vinyl acetate, 1 part alkali earth metal stearate, 1 part chlorinated rubber, and a suitable solvent.

8. A thermoplastic composition for use in uniting layers of fabric and having a melting point at substantially 300° F. comprising, substantially 69 parts of composite polymer of conjointly polymerized vinyl acetate and vinyl chloride, substantially 31 parts of the simple polymer of vinyl acetate, 1 part alkali earth metal stearate, 1 part chlorinated rubber, 61 parts acetone and 123 parts toluol.

9. A thermoplastic composition for use in uniting fabrics and having a melting point above 300° F. comprising, between 10 and 90 parts of a composite polymer of conjointly polymerized vinyl acetate and vinyl chloride, between 90 and 10 parts of simple polymer of vinyl acetate, 10 parts dibutyl phthalate, and 1 part chlorinated rubber.

10. A thermoplastic composition for use in uniting fabrics to form a substantially unitary laminated fabric, and insoluble in alcohol, naphtha, gasoline, benzine and cold or boiling water, comprising a mixture of between 10 and 90 parts of composite polymer of conjointly polymerized vinyl acetate and vinyl chloride, between 90 and 10 parts of simple polymer of vinyl acetate, and a compatible plasticizer.

11. A medium for forming laminated fabrics, comprising a sheet of material impregnated with a thermoplastic composition which maintains its adhesive qualities at temperatures below 212° F. and including a mixture of between 10 and 90 parts of a composite polymer of conjointly polymerized vinyl acetate and vinyl chloride, and 90 and 10 parts of a simple polymer of vinyl acetate.

12. A medium for forming laminated fabrics, comprising a sheet of material impregnated with a thermoplastic composition which maintains its adhesive qualities at temperatures below 212° F., said composition comprising between 10 and 90 parts of composite polymer of conjointly polymerized vinyl acetate and vinyl chloride, between 90 and 10 parts of simple polymer of vinyl acetate, a small quantity of vat blue, and a suitable solvent.

13. A medium for forming laminated fabrics, comprising a sheet of material impregnated with a thermoplastic composition which maintains its adhesive qualities at temperatures below 212° F., said composition comprising between 10 and 90 parts of composite polymer of conjointly polymerized vinyl acetate and vinyl chloride, between 90 and 10 parts of simple polymer of vinyl acetate, a small quantity of vat blue, a suitable solvent, substantially 1 part of alkali earth metal stearate, and substantially one part chlorinated rubber.

14. A medium for forming laminated fabrics, comprising a sheet of material impregnated with a thermoplastic composition which maintains its adhesive qualities at temperatures below 212° F., comprising substantially 100 parts of a mixture of from 10 to 90 parts of a composite polymer of conjointly polymerized vinyl acetate and vinyl chloride and 90 to 10 parts of a simple polymer of vinyl acetate, 10 parts dibutyl phthalate, and 1 part chlorinated rubber.

15. A medium for forming laminated fabrics, comprising a sheet of material impregnated with a thermoplastic composition which maintains its adhesive qualities at temperatures below 212° F. and which is insoluble in alcohol, naphtha, gasoline, benzine and laundering fluids, comprising between 10 and 90 parts of composite polymer of conjointly polymerized vinyl acetate and vinyl chloride, between 90 and 10 parts of simple polymer of vinyl acetate, and a suitable plasticizer.

16. A composition comprising a composite polymer of conjointly polymerized vinyl acetate and vinyl chloride, a simple polymer of vinyl acetate and a solvent, the proportion of the composite polymer to the simple polymer being such that the composition has a softening point or melting range at approximately 300° F. and maintains its adhesive properties at temperatures below 212° F., and such that the composition possesses good color stability and is substantially insoluble in alcohol, naphtha, gasolene, benzine or boiling water.

RALPH M. FREYDBERG.